United States Patent
Zhu et al.

(10) Patent No.: US 12,335,679 B2
(45) Date of Patent: Jun. 17, 2025

(54) AUDIO SIGNAL PROCESSING METHOD, TERMINAL DEVICE AND STORAGE MEDIUM

(71) Applicant: GOERTEK INC., Shandong (CN)

(72) Inventors: Zongxia Zhu, Shandong (CN); Kang An, Shandong (CN); Jie Wu, Shandong (CN); Kaifa Shu, Shandong (CN); Feifei Han, Shandong (CN); Zheng Yang, Shandong (CN); Dingyun Li, Shandong (CN)

(73) Assignee: GOERTEK INC., Weifang (CN)

( * ) Notice: Subject to any disclaimer, the term of this patent is extended or adjusted under 35 U.S.C. 154(b) by 327 days.

(21) Appl. No.: 18/044,921

(22) PCT Filed: Oct. 31, 2020

(86) PCT No.: PCT/CN2020/125633
§ 371 (c)(1),
(2) Date: Mar. 10, 2023

(87) PCT Pub. No.: WO2022/052256
PCT Pub. Date: Mar. 17, 2022

(65) Prior Publication Data
US 2023/0276165 A1    Aug. 31, 2023

(30) Foreign Application Priority Data
Sep. 10, 2020 (CN) .......................... 202010953528.6

(51) Int. Cl.
*H04R 25/00* (2006.01)
*G10L 15/02* (2006.01)
(Continued)

(52) U.S. Cl.
CPC ............ *H04R 1/1091* (2013.01); *G10L 15/02* (2013.01); *H04R 1/222* (2013.01); *H04R 2460/13* (2013.01)

(58) Field of Classification Search
CPC .. H04R 1/1091; H04R 1/222; H04R 2460/13; H04R 3/005; H04R 3/04; G10L 15/02; G10L 21/02
(Continued)

(56) References Cited

U.S. PATENT DOCUMENTS

2004/0264718 A1   12/2004 Arai
2020/0219525 A1    7/2020 Moon et al.
2024/0005937 A1*   1/2024 Luneau ................. G10L 15/063

FOREIGN PATENT DOCUMENTS

CN    105721973 A    6/2016
CN    108476369 A    8/2018
(Continued)

OTHER PUBLICATIONS

Processing Method of audio signal (Year: 2020).*
(Continued)

*Primary Examiner* — Phylesha Dabney
(74) *Attorney, Agent, or Firm* — Shih IP Law Group, PLLC

(57) ABSTRACT

An audio signal processing method including the following steps: acquiring a bone conduction audio signal collected by a bone conduction vibration pickup device; acquiring a low frequency transfer function which matches the bone conduction audio signal and a high frequency transfer function corresponding to the low frequency transfer function, wherein the low frequency transfer function and the high frequency transfer function are corresponding transfer functions between the bone conduction audio signal and an air conduction audio signal which correspond to the same
(Continued)

voice; and performing frequency domain extension on the bone conduction audio signal on the basis of the low frequency transfer function and the high frequency transfer function, and taking the extended initial audio as output audio. The effect of improving the integrity pf a voice signal collected by a terminal device is achieved.

10 Claims, 3 Drawing Sheets

(51) Int. Cl.
*H04R 1/10* (2006.01)
*H04R 1/22* (2006.01)

(58) Field of Classification Search
USPC ........................................................ 381/380
See application file for complete search history.

(56) References Cited

FOREIGN PATENT DOCUMENTS

| | | | | |
|---|---|---|---|---|
| CN | 108496285 | A | 9/2018 | |
| CN | 110996215 | A | 4/2020 | |
| CN | 112017677 | A * | 12/2020 | ............. G10L 15/02 |
| EP | 2811485 | A1 * | 12/2014 | ......... G10L 21/0208 |

OTHER PUBLICATIONS

Sound correcting apparatus (Year: 2014).*
International Search Report from International Application No. PCT/CN2020/125633 mailed Jun. 9, 2021.

* cited by examiner

AUDIO SIGNAL PROCESSING METHOD, TERMINAL DEVICE AND STORAGE MEDIUM

This application claims the priority to the Chinese patent application No. 202010953528.6, entitled "audio signal processing method, terminal device and storage medium", filed with the Chinese Patent Office on Sep. 10, 2020, the entire content of which is incorporated herein by reference.

TECHNICAL FIELD

The present disclosure relates to the technical field of audio processing, in particular to an audio signal processing method, a terminal device and a computer-readable storage medium.

BACKGROUND TECHNOLOGY

Bone conduction is a mode of sound conduction, that is, a mode of transforming sound into mechanical vibration of different frequencies, and transmitting sound waves through human skull, bone labyrinth, inner ear lymph, spiral organ and auditory center. Compared with the traditional sound conduction mode that generates sound waves through the diaphragm, bone conduction eliminates a plurality of steps of sound wave transmission, and can achieve clear sound restoration in noisy environments. Besides, sound waves may not affect others due to their diffusion in the air. Because of the above advantages of bone conduction, a device which collects user's sound signal on the basis of bone conduction has emerged.

However, in the existing bone conduction devices, due to the hardware defects of bone conduction vibration pickup device, serious high frequency attenuation phenomenon may occur in the audio signals collected by the bone conduction vibration pickup device. As a result, the audio signal collected by bone conduction audio acquisition device is not integral.

The above content is only used to assist understand the technical solution of the present disclosure, and does not mean that the above content is recognized as prior art.

SUMMARY

The main purpose of the present disclosure is to provide an audio signal processing method, a terminal device and a computer readable storage medium, aiming at achieving the purpose of improving the integrity of the voice signal collected by the terminal device.

To achieve the above purpose, the present disclosure provides a audio signal processing method including the following steps:
acquiring a bone conduction audio signal collected by a bone conduction vibration pickup device;
acquiring a low frequency transfer function which matches the bone conduction audio signal and a high frequency transfer function corresponding to the low frequency transfer function, wherein the low frequency transfer function and the high frequency transfer function are corresponding transfer functions between the bone conduction audio signal and an air conduction audio signal which correspond to the same voice; and
performing frequency domain extension on the bone conduction audio signal on the basis of the low frequency transfer function and the high frequency transfer function, and taking the extended initial audio as output audio.

Optionally, the step of acquiring a low frequency transfer function which matches the bone conduction audio signal and a high frequency transfer function corresponding to the low frequency transfer function includes:
acquiring a low frequency characteristic of the bone conduction audio signal; and
acquiring the low frequency transfer function which matches the low frequency characteristic and the high frequency transfer function corresponding to the low frequency transfer function.

Optionally, the audio signal processing method is applied to a terminal device, and the step of acquiring the low frequency transfer function which matches the low frequency characteristic and the high frequency transfer function corresponding to the low frequency transfer function includes:
transmitting the low frequency characteristic to a server, wherein the server is configured to acquire the low frequency transfer function which matches the low frequency characteristic, and the high frequency transfer function corresponding to the low frequency transfer function stored in a cloud database, according to the received low frequency characteristic, and transmit the low frequency transfer function and the high frequency transfer function to the terminal device; and
receiving the low frequency transfer function and the high frequency transfer function transmitted by the server.

Optionally, the audio signal processing method is applied to a terminal device, the step of acquiring the low frequency transfer function matches the bone conduction audio signal and the high frequency transfer function corresponding to the low frequency transfer function includes:
transmitting the bone conduction audio signal to a server, wherein the server is configured to acquire the low frequency which matches the initial audio, and the high frequency transfer function corresponding to the low frequency transfer function stored in a cloud database, according to the received bone conduction audio signal, and transmit the acquired low frequency transfer function and high frequency transfer function to the terminal device; and
receiving the low frequency transfer function and the high frequency transfer function transmitted by the server.

Optionally, the low frequency transfer function one-to-one corresponds to the high frequency transfer function, and the low frequency transfer function and the high frequency transfer function are stored in a database in an associated manner.

Optionally, after the step of acquiring a bone conduction audio signal collected by a bone conduction vibration pickup device, the audio signal processing method further includes:
acquiring an air conduction audio signal collected by the microphone;
determining the low frequency transfer function and the high frequency transfer function according to the bone conduction audio signal and the air conduction audio signal; and
storing the low frequency characteristic of the initial audio, the low frequency transfer function and the high frequency transfer function in an associated manner.

Optionally, the step of determining the low frequency transfer function and the high frequency transfer function according to the bone conduction audio signal and the air conduction audio signal includes:
acquiring a first low frequency characteristic of the bone conduction audio signal and a second low frequency characteristic of the air conduction audio signal;

acquiring a first high frequency characteristic of the bone conduction audio signal and a second high frequency characteristic of the air conduction audio signal; and determining the low frequency transfer function according to the first low frequency characteristic and the second low frequency characteristic, and determining the high frequency transfer function according to the first high frequency characteristic and the second high frequency characteristic.

Optionally, the low frequency transfer function and the high frequency transfer function are acquired on the basis of a training voice signal, wherein the training voice signal includes the bone conduction audio signal and the air conduction audio signal corresponding to the same voice.

In addition, in order to achieve the above purpose, the present disclosure further provides a terminal device, including a memory, a processor and an audio signal processing program stored on the memory and operable on the processor, and when the audio signal processing program is executed by the processor, the steps of the audio signal processing method described in the above are implemented.

In addition, in order to achieve the above purpose, the present disclosure further provides a computer readable storage medium on which an audio signal processing program is stored, and when the audio signal processing program is executed by the processor, the steps of the audio signal processing method described in the above are implemented.

According to an audio signal processing method, a terminal device and a computer readable storage medium proposed in the embodiment of the present disclosure, a bone conduction audio signal collected by a bone conduction vibration pickup device is acquired at first, and then a low frequency transfer function which matches the bone conduction audio signal and a high frequency transfer function corresponding to the low frequency transfer function are acquired, wherein the low frequency transfer function and the high frequency transfer function are corresponding transfer functions between the bone conduction audio signal and an air conduction audio signal which correspond to the same voice. Then, frequency domain extension is performed on the bone conduction audio signal on the basis of the low frequency transfer function and the high frequency transfer function, and the extended initial audio is taken as output audio. Since the high frequency part of the bone conduction audio signal collected by the bone conduction vibration pickup device can be extended through the low frequency transfer function and the high frequency transfer function, the terminal device can obtain a complete audio signal on the basis of the initial audio signal collected by the bone conduction vibration pickup device. This achieves the effect of improving the integrity of the audio signal collected by the bone conduction vibration pickup device.

The purpose achievement, functional features and advantages of the present disclosure will be further described with reference to the attached drawings in combination with the embodiments.

DETAILED DESCRIPTION OF EMBODIMENTS

It should be understood that the specific embodiments described herein are only used to illustrate the present application, not to define the present application.

In the existing bone conduction devices, due to the hardware defects of bone conduction vibration pickup device, serious high frequency attenuation phenomenon may occur in the audio signals collected by the bone conduction vibration pickup device. As a result, the audio signal collected by bone conduction audio acquisition device is not integral.

In order to solve the above defects, the embodiment of the present disclosure proposes an audio signal processing method, and the main solution thereof includes the following steps:

acquiring a bone conduction audio signal collected by a bone conduction vibration pickup device;

acquiring a low frequency transfer function which matches the bone conduction audio signal and a high frequency transfer function corresponding to the low frequency transfer function, wherein the low frequency transfer function and the high frequency transfer function are corresponding transfer functions between the bone conduction audio signal and an air conduction audio signal which correspond to the same voice; and performing frequency domain extension on the bone conduction audio signal on the basis of the low frequency transfer function and the high frequency transfer function, and taking extended initial audio as output audio.

Since the high frequency part of the bone conduction audio signal collected by the bone conduction vibration pickup device can be extended through the low frequency transfer function and the high frequency transfer function, the terminal device can obtain a complete audio signal on the basis of the initial audio signal collected by the bone conduction vibration pickup device. This achieves the effect of improving the integrity of the audio signal collected by the bone conduction vibration pickup device.

Figure 1:
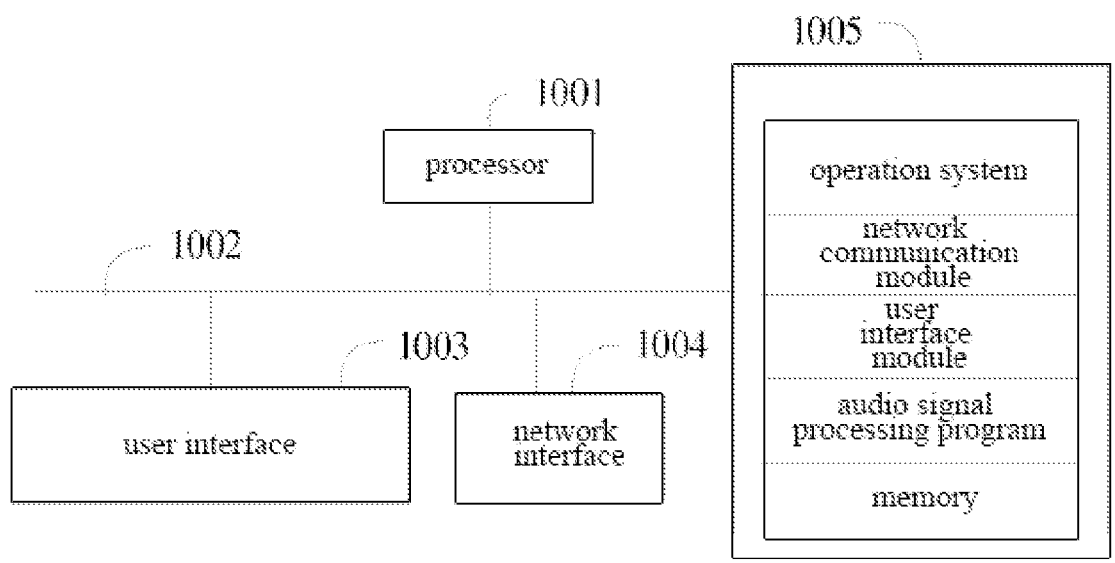
FIG. 1 is a schematic diagram of the terminal structure of the hardware operation environment according to the embodiment of the present disclosure.

As shown in FIG. 1, FIG. 1 is a schematic diagram of the terminal structure of the hardware operation environment according to the embodiment of the present disclosure.

The terminal of the embodiment of the present disclosure may be terminal devices such as bone conduction headset or the like.

As shown in FIG. 1, the terminal may include: a processor 1001, such as CPU; a network interface 1004; a user interface 1003; a memory 1005; and a communication bus 1002. Here, the communication bus 1002 is used to realize connection and communication between these components. The user interface 1003 may include bone conduction vibration pickup device, etc. Optionally, the user interface 1003 may also include standard wired interfaces and wireless interfaces. Optionally, the network interface 1004 may include standard wired interface and wireless interface (such as WI-FI interface). The memory 1005 may be a high speed RANI memory or a stable memory (non-volatile memory), such as a disk memory. Optionally, the memory 1005 may also be a storage device independent of the processor 1001 described in the above.

Those skilled in the art can understand that the terminal structure shown in FIG. 1 does not constitute a limitation to the terminal, and may include more or fewer components than those shown in the drawings, or combination of some components, or different component arrangements.

As shown in FIG. 1, the memory 1005, which is a computer storage medium, may include an operating system, a network communication module, a user interface module and an audio signal processing program therein.

In the terminal shown in FIG. 1, the network interface 1004 is mainly used to connect the background server and perform data communication with the background server; the processor 1001 may be used to call the audio signal processing program stored in the memory 1005 and perform the following operations:

acquiring a bone conduction audio signal collected by the bone conduction vibration pickup device;

acquiring a low frequency transfer function which matches the bone conduction audio signal and a high frequency transfer function corresponding to the low frequency transfer function, wherein the low frequency transfer function and the high frequency transfer function are corresponding transfer functions between the bone conduction audio signal and an air conduction audio signal which correspond to the same voice; and performing frequency domain extension on the bone conduction audio signal on the basis of the low frequency transfer function and the high frequency transfer function, and taking extended initial audio as output audio.

Furthermore, the processor 1001 may call the audio signal processing program stored in the memory 1005 and perform the following operations:

acquiring the low frequency characteristic of the bone conduction audio signal; and acquiring the low frequency transfer function which matches the low frequency characteristic and the high frequency transfer function corresponding to the low frequency transfer function.

Furthermore, the processor 1001 may call the audio signal processing program stored in the memory 1005 and perform the following operations: transmitting the low frequency characteristic to a server, wherein the server is configured to acquire the low frequency transfer function which matches the low frequency characteristic, and the high frequency transfer function corresponding to the low frequency transfer function stored in a cloud database, according to the received low frequency characteristic, and transmit the low frequency transfer function and the high frequency transfer function to the terminal device; and receiving the low frequency transfer function and the high frequency transfer function transmitted by the server.

Furthermore, the processor 1001 may call the audio signal processing program stored in the memory 1005 and perform the following operations:

transmitting the bone conduction audio signal to a server, wherein the server is configured to acquire the low frequency which matches the initial audio, and the high frequency transfer function corresponding to the low frequency transfer function stored in a cloud database, according to the received bone conduction audio signal, and transmit the acquired low frequency transfer function and high frequency transfer function to the terminal device; and receiving the low frequency transfer function and the high frequency transfer function transmitted by the server.

Furthermore, the processor 1001 may call the audio signal processing program stored in the memory 1005 and perform the following operations:

acquiring an air conduction audio signal collected by the microphone;

determining the low frequency transfer function and the high frequency transfer function according to the bone conduction audio signal and the air conduction audio signal; and storing the low frequency characteristic of the initial audio, the low frequency transfer function and the high frequency transfer function in an associated manner.

Furthermore, the processor 1001 may call the audio signal processing program stored in the memory 1005 and perform the following operations: acquiring a first low frequency characteristic of the bone conduction audio signal and a second low frequency characteristic of the air conduction audio signal; acquiring a first high frequency characteristic of the bone conduction audio signal and a second high frequency characteristic of the air conduction audio signal; and determining the low frequency transfer function according to the first low frequency characteristic and the second low frequency characteristic, and determining the high frequency transfer function according to the first high frequency characteristic and the second high frequency characteristic.

Figure 2:
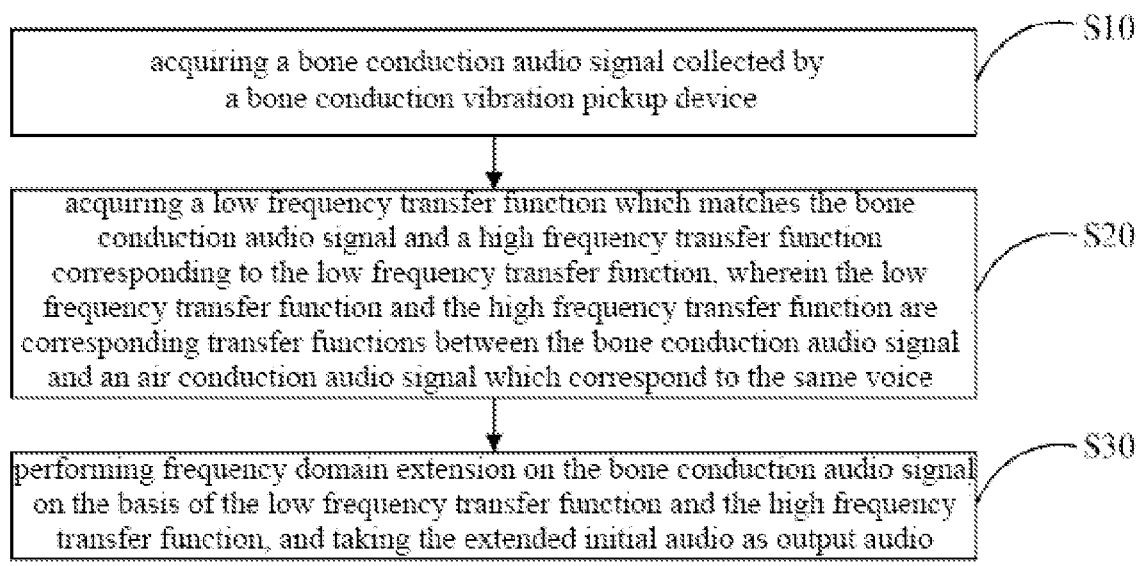
FIG. 2 is a schematic flowchart of an embodiment of the audio signal processing method of the present disclosure.

Referring to FIG. 2, in an embodiment of the audio signal processing method of the present disclosure, the audio signal processing method includes the following steps:

step S10: acquiring a bone conduction audio signal collected by a bone conduction vibration pickup device;

step S20, acquiring a low frequency transfer function which matches the bone conduction audio signal and a high frequency transfer function corresponding to the low frequency transfer function, wherein the low frequency transfer function and the high frequency transfer function are corresponding transfer functions between the bone conduction audio signal and an air conduction audio signal which correspond to the same voice; and step S30: performing frequency domain extension on the bone conduction audio signal on the basis of the low frequency transfer function and the high frequency transfer function, and taking the extended initial audio as output audio.

Bone conduction is a mode of sound conduction, that is, a mode of transforming sound into mechanical vibration of different frequencies, and transmitting sound waves through human skull, bone labyrinth, inner ear lymph, spiral organ and auditory center. Compared with the traditional sound conduction mode that generates sound waves through the diaphragm, bone conduction eliminates a plurality of steps of sound wave transmission, and can achieve clear sound restoration in noisy environments. Besides, sound waves may not affect the others due to their diffusion in the air. Because of the above advantages of bone conduction, a device which collects user's sound signal on the basis of bone conduction has emerged.

However, in the existing bone conduction devices, due to the hardware defects of bone conduction vibration pickup device, serious high frequency attenuation phenomenon may occur in the audio signals collected by the bone conduction vibration pickup device, as a result, the audio signal collected by bone conduction audio acquisition device is not integral.

In order to solve the defect that the existing bone conduction audio acquisition device can only be applied to the low frequency environment but cannot collect the high frequency part of the sound source voice, the embodiment of the present disclosure proposes an audio signal processing method.

In this embodiment, the above audio signal processing method is applied to the terminal device which is provided with the bone conduction vibration pickup device. Here, the bone conduction vibration pickup device is used to collect the vibration wave of an object that vibrates due to the sound source voice, and convert the vibration wave into a voice signal.

As an example, the above terminal device is provided as a bone conduction headset. When a user wears the bone conduction headset, the body may vibrate simultaneously during the user speech. Therefore, the bone conduction vibration pickup device disposed on the bone conduction headset can collect the vibration wave of the user's body and convert the vibration wave into an audio signal.

When the terminal device is provided with a bone conduction vibration pickup device, audio can be acquired through the bone conduction vibration pickup device, and then the initial audio acquired by the bone conduction vibration pickup device can be obtained.

Furthermore, after acquiring the bone conduction audio signal, the pre-stored low frequency transfer function which matches the bone conduction audio signal and the pre-stored high frequency transfer function corresponding to the low frequency transfer function can be acquired. It can be understood that the high frequency transfer function and the low frequency transfer function described in the above are pre-stored data. Here, the low frequency transfer function and the high frequency transfer function are corresponding transfer functions between the bone conduction audio signal and an air conduction audio signal which correspond to the same voice.

Specifically, after acquiring the bone conduction audio signal, the low frequency characteristic of the initial audio can be acquired, and then the pre-stored low frequency which matches the low frequency characteristic in the database is inquired.

As an example, when the bone conduction audio signal collected by the bone conduction vibration pickup device is acquired, the acquired signal is converted at first to convert the time domain signal to the frequency domain signal. It should be noted that the terminal device may acquire the bone conduction audio signal collected by the bone conduction vibration pickup device at first, wherein the above-described bone conduction audio signal directly acquired by the terminal device is a time domain signal. Therefore, after acquiring the above initial audio, the bone conduction audio signal can be converted from the time domain signal to the frequency domain signal on the basis of FFT (fast Fourier transform). Furthermore, the converted bone conduction audio signal can be analyzed to extract the low frequency characteristic of the bone conduction audio signal. Here, the above-described low frequency characteristic may include resonance energy change of the bone conduction audio signal, and characteristics such as the amplitude and the frequency distribution. Furthermore, after acquiring the low frequency characteristic of the bone conduction audio signal, the low frequency transfer function which matches the low frequency characteristic can be inquired in the database on the basis of the low frequency characteristic. For example, if each frequency point in the low frequency is not lost and ΔSPL (sensitivity difference value) per frequency=±0.1 dB, it is considered that the low frequency characteristic matches the pre-stored low frequency characteristic. Here, the pre-stored low frequency characteristic and the low frequency transfer function may be stored in the database in an associated manner. Therefore, when the low frequency characteristic of the acquired bone conduction audio signal matches the pre-stored low frequency characteristic stored in the database, the matched low frequency characteristic are associated with the low frequency transfer function. Furthermore, the database also stores the high frequency transfer function that one-to-one corresponds to the low frequency transfer function and is stored in associated with the low frequency transfer function. Therefore, after acquiring the low frequency transfer function, the high frequency transfer function corresponding to the low frequency transfer function can also be obtained.

Optionally, as an implementation method, after acquiring the low frequency characteristics of the bone conduction audio signal, the low frequency characteristic may also be transmitted to the server, wherein the server is configured to acquire the low frequency transfer function which matches the low frequency characteristic, and the high frequency transfer function corresponding to the low frequency transfer function stored in a cloud database, according to the received low frequency characteristic, and transmit the low frequency transfer function and the high frequency transfer function to the terminal device. then the low frequency transfer function and the high frequency transfer function transmitted by the server are received. Since the above transfer functions are stored in the cloud server, database managers can more easily update the above-described low frequency transfer function and high frequency transfer function stored in the database, to adapt to users in more application scenarios with different sound characteristics.

It should be noted that the low frequency transfer function and the high frequency transfer function are acquired on the basis of the training voice signal, wherein the training voice signal includes the bone conduction audio signal and the air conduction audio signal corresponding to the same voice.

As an example, during the training process, the voice output from the same sound source can be acquired simultaneously through the bone conduction vibration pick up device and the microphone. In this example, the audio signal corresponding to the voice collected by the bone conduction vibration pickup device is described as the bone conduction audio signal. The audio signal corresponding to the audio collected by the microphone or the like is described as the air conduction audio signal (i.e. the audio signal corresponding to the sound wave transmitted through the air collected by the microphone). Then, the bone conduction audio signal and the air conduction audio signal are converted from the time domain signal to the frequency domain signal. The bone conduction audio signal and air conduction audio signal converted into frequency domain signal are subjected to signal analysis to obtain the first low frequency characteristic and the first high frequency characteristic of the bone conduction audio signal, and the second low frequency characteristic and the second high frequency characteristic corresponding to the air conduction audio signal. Then, the low frequency transfer function is determined according to the first low frequency characteristic and the second low frequency characteristic, and the high frequency transfer function is determined according to the first high frequency characteristic and the second high frequency characteristic.

Specifically, in this example, in a training process, the bone conduction audio signal and air conduction audio signal can be recorded simultaneously, and the bone conduction audio signal and the air conduction audio signal can be converted from the time domain to the frequency domain through FFT, and the characteristics such as the frequency, the amplitude in the frequency domain signal can be extracted to determine the low frequency characteristic (<preset frequency value, such as 2 KHz) and high frequency characteristic (>preset frequency value) generated by each piece of voice. Here, the low frequency characteristic is generally merely the change in resonance energy, whereas the high frequency characteristic is change, such as complex attenuation, frequency loss or the like. Furthermore, $x_1(n)$ indicates frequency domain representation for the low frequency part in the bone conduction audio signal; $x_2(n)$ indicates frequency domain representation for the high frequency part in the bone conduction audio signal; $y_1(n)$ indicates the frequency domain representation for the low frequency part in the air conductance audio signal; $y_2(n)$ indicates the frequency domain representation for the high frequency part in the air conductance audio signal. Furthermore, the frequency domain transfer function $h_1(n)$ corresponding to the low frequency part can be calculated according to the following formula:

$$h_1(n)=x_1(n)/y_1(n);$$

the frequency domain transfer function $h_2(n)$ corresponding to the high frequency part can be calculated according to the following formula:

$$h_2(n)=x_2(n)/y_2(n)$$

Furthermore, in this example, the time domain transfer function $h_1(t)$ corresponding to the low frequency part and the time domain transfer function $h_2(t)$ corresponding to the high frequency part can be obtained by inverse transformation. Here, the time domain transfer function $h_1(t)$ corresponding to the low frequency part and the time domain transfer function $h_2(t)$ corresponding to the high frequency part can only be used in pairs and cannot be used separately. In addition, each group of training voice may generate the time domain transfer function $h_1(t)$ corresponding to the low frequency part and the time domain transfer function $h_2(t)$ corresponding to the high frequency part and they may be stored in the database in an associated manner.

Furthermore, after acquiring the low frequency transfer function and the high frequency transfer function corresponding to the bone conduction audio signal collected by the bone conduction vibration pickup device at the current time, frequency domain extension can be performed on the bone conduction audio signal on the basis of the low frequency transfer function and the high frequency transfer function.

Specifically, after acquiring the bone conduction audio signal x (t), frequency domain extension can be performed on the bone conduction audio signal x (t) on the basis of on the following formula:

$$y(t)=x(t)/[h1(t)*h2(t)]$$

wherein y (t), h1 (t) and h2 (t) are the extended audio signal, low frequency transfer function and high frequency transfer function, respectively. After extending the bone conduction audio signal, the extended bone conduction audio signal can be taken as the output audio of the terminal device.

As an example, when the terminal device is a bone conduction headset, the above-described bone conduction headset can be taken as the audio acquisition device of the mobile terminal, and thereby the bone conduction headset can transmit the extended bone conduction audio signal to the terminal device connected thereto as output audio.

It should be noted that, in order to improve the quality of the output audio obtained by the audio signal processing method described in this embodiment, the low frequency transfer function and high frequency transfer function which match the initial audio can be dynamically updated according to the initial audio received in real time, for example, updating 10-50 times per second.

In the technical solution disclosed in this embodiment, the method includes acquiring a bone conduction audio signal collected by a bone conduction vibration pickup device at first; then acquiring a low frequency transfer function which matches the bone conduction audio signal and a high frequency transfer function corresponding to the low frequency transfer function, wherein the low frequency transfer function and the high frequency transfer function are corresponding transfer functions between the bone conduction audio signal and an air conduction audio signal which correspond to the same voice; and performing frequency domain extension on the bone conduction audio signal on the basis of the low frequency transfer function and the high frequency transfer function and taking the extended initial audio as output audio. Since the high frequency part of the bone conduction audio signal collected by the bone conduction vibration pickup device can be extended through the low frequency transfer function and the high frequency transfer function, the terminal device can obtain a complete audio signal based on the initial audio collected by the bone conduction vibration pickup device. This achieves the effect of improving the integrity of the audio signal collected by the bone conduction vibration pickup device.

Figure 3:
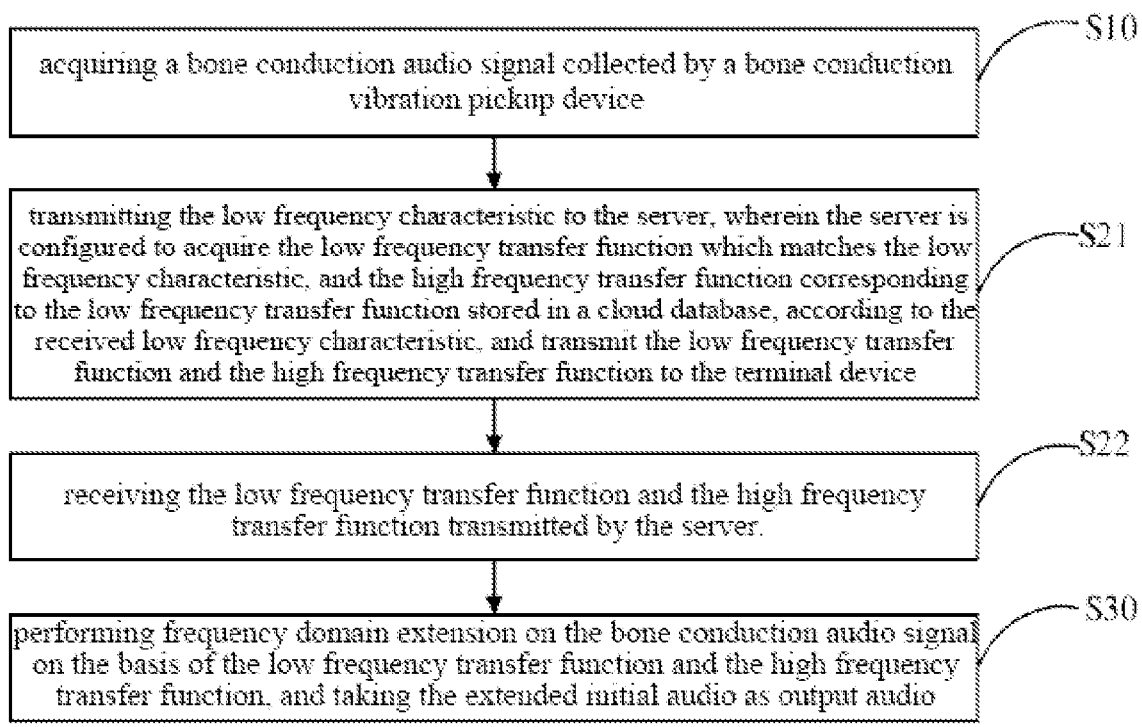
FIG. 3 is a schematic flowchart of another embodiment of the audio signal processing method of the present disclosure.

Referring to FIG. 3, according to the above embodiment, in another embodiment, the step S20 includes:

Step S21: transmitting the low frequency characteristic to the server, wherein the server is configured to acquire the low frequency transfer function which matches the low frequency characteristic, and the high frequency transfer function corresponding to the low frequency transfer function stored in a cloud database, according to the received low frequency characteristic, and transmit the low frequency transfer function and the high frequency transfer function to the terminal device; and Step S22: receiving the low frequency transfer function and the high frequency transfer function transmitted by the server.

In this embodiment, the bone conduction audio signal can be transmitted to the server, wherein the server is configured to acquire the low frequency which matches the initial audio, and the high frequency transfer function corresponding to the low frequency transfer function stored in a cloud database, according to the received bone conduction audio signal, and transmit the acquired low frequency transfer function and high frequency transfer function to the terminal device; and the low frequency transfer function and the high frequency transfer function transmitted by the server can be received.

It should be noted that, after receiving the above-described bone conduction audio signal, the server compares the low frequency characteristic of the initial audio described in the above with the pre-stored low frequency characteristic. Here, the pre-stored low frequency characteristic described in the above may be the low frequency characteristic of the bone conduction audio signal in the pre-stored training voice signal. Therefore, the server can acquire the low frequency transfer function and high frequency transfer function which match the above-described bone conduction audio signal and are determined based on the training voice signal, and transmit the acquired low frequency transfer function and high frequency transfer function to the terminal device.

In the technical solution disclosed in this embodiment, since the process of determining the low frequency transfer function and high frequency transfer function can be completed by the server, the effect of reducing the operation cost of the terminal equipment is achieved.

In addition, the embodiment of the present disclosure also proposes a terminal device, which includes a memory, a processor and an audio signal processing program stored on the memory and operable on the processor. When the audio signal processing program is executed by the processor, the steps of the audio signal processing method described in the above embodiments are implemented.

Optionally, the terminal device is a bone conduction headset.

In addition, the embodiment of the present disclosure also proposes a computer readable storage medium on which an audio signal processing program is stored. When the audio signal processing program is executed by the processor, the steps of the audio signal processing method described in the above embodiments are implemented.

It should be noted that, the terms "including", "comprising" or any other variant thereof mentioned herein are intended to include non-exclusive inclusion, so that a process, method, article or system that includes a series of elements not only includes those elements, but also includes other elements not explicitly listed, or also includes elements inherent to such process, method, article or system. Without more restrictions, the element defined by the statement "comprising a . . . " does not exclude the existence of another identical element in the process, method, article or system that includes the element.

The serial number of the embodiments of the present disclosure is only for description and does not represent the advantages and disadvantages of the embodiments.

Through the above description of the embodiments, those skilled in the art can clearly understand that the above embodiments can be implemented by means of software and the necessary general hardware platform, of course, can be implemented by means of hardware, but in many cases the former is a better implementation. Based on this understanding, the technical solution of the present disclosure, in essence, or the part that contributes to the prior art, can be embodied in the form of a software product. The computer software product is stored in one storage medium (such as ROM/RAM, magnetic disc, optical disc) as described in the above, including several instructions to enable one terminal device (may be a bone conduction headset, etc.) to execute the methods described in various embodiments of the present disclosure.

The above is only a preferred embodiment of the present disclosure, and does not limit the scope of the patent of the present disclosure. Any equivalent structure or equivalent process transformation made by using the contents of the Description and the accompanying drawings of the present disclosure, or directly or indirectly applying in other related technical fields, is similarly included in the protection scope of patent of the present disclosure.

What is claimed is:

1. An audio signal processing method, wherein, the audio signal processing method comprises:
  acquiring a bone conduction audio signal collected by a bone conduction vibration pickup device;
  acquiring a low frequency transfer function which matches the bone conduction audio signal and a high frequency transfer function corresponding to the low frequency transfer function, wherein the low frequency transfer function and the high frequency transfer function are corresponding transfer functions between the bone conduction audio signal and an air conduction audio signal which correspond to the same voice; and
  performing frequency domain extension on the bone conduction audio signal on the basis of the low frequency transfer function and the high frequency transfer function, and taking the extended initial audio as output audio.

2. The audio signal processing method according to claim 1, wherein, the step of acquiring a low frequency transfer function which matches the bone conduction audio signal and a high frequency transfer function corresponding to the low frequency transfer function comprises:
  acquiring a low frequency characteristic of the bone conduction audio signal; and
  acquiring the low frequency transfer function which matches the low frequency characteristic and the high frequency transfer function corresponding to the low frequency transfer function.

3. The audio signal processing method according to claim 2, wherein the audio signal processing method of is applied to a terminal device, and wherein acquiring the low frequency transfer function which matches the low frequency characteristic and the high frequency transfer function corresponding to the low frequency transfer function comprises:
  transmitting the low frequency characteristic to a server, wherein the server is configured to acquire the low frequency transfer function which matches the low frequency characteristic, and the high frequency transfer function corresponding to the low frequency transfer function stored in a cloud database, according to the received low frequency characteristic, and transmit the low frequency transfer function and the high frequency transfer function to the terminal device; and
  receiving the low frequency transfer function and the high frequency transfer function transmitted by the server.

4. The audio signal processing method according to claim 1, wherein the audio signal processing method is applied to a terminal device and wherein acquiring the low frequency transfer function matches the bone conduction audio signal and the high frequency transfer function corresponding to the low frequency transfer function comprises:
  transmitting the bone conduction audio signal to a server, wherein the server is configured to acquire the low frequency which matches the initial audio, and the high frequency transfer function corresponding to the low frequency transfer function stored in a cloud database, according to the received bone conduction audio signal, and transmit the acquired low frequency transfer function and high frequency transfer function to the terminal device; and
  receiving the low frequency transfer function and the high frequency transfer function transmitted by the server.

5. The audio signal processing method according to claim 1, wherein the low frequency transfer function one-to-one corresponds to the high frequency transfer function, and the low frequency transfer function and the high frequency transfer function are stored in a database in an associated manner.

6. The audio signal processing method according to claim 1, wherein, after the acquiring a bone conduction audio signal collected by a bone conduction vibration pickup device, the audio signal processing method further comprises:
  acquiring an air conduction audio signal collected by the microphone;
  determining the low frequency transfer function and the high frequency transfer function according to the bone conduction audio signal and the air conduction audio signal; and
  storing the low frequency characteristic of the initial audio, the low frequency transfer function and the high frequency transfer function in an associated manner.

7. The audio signal processing method according to claim 6, wherein determining the low frequency transfer function and the high frequency transfer function according to the bone conduction audio signal and the air conduction audio signal comprises:
   acquiring a first low frequency characteristic of the bone conduction audio signal and a second low frequency characteristic of the air conduction audio signal;
   acquiring a first high frequency characteristic of the bone conduction audio signal and a second high frequency characteristic of the air conduction audio signal; and
   determining the low frequency transfer function according to the first low frequency characteristic and the second low frequency characteristic, and determining the high frequency transfer function according to the first high frequency characteristic and the second high frequency characteristic.

8. The audio signal processing method according to claim 1, wherein the low frequency transfer function and the high frequency transfer function are acquired on the basis of a training voice signal, wherein the training voice signal comprises the bone conduction audio signal and the air conduction audio signal corresponding to the same voice.

9. A terminal device, wherein the terminal device comprises a memory, a processor and an audio signal processing program stored on the memory and operable on the processor, wherein the audio signal processing program, when executed by the processor, implements steps of the audio signal processing method according to claim 1.

10. A computer readable storage medium, wherein an audio signal processing program is stored on the computer readable storage medium, wherein the audio signal processing program, when executed by the processor, implements the steps of the audio signal processing method according to claim 1.

* * * * *